United States Patent [19]
Ohta

[11] Patent Number: 5,528,092
[45] Date of Patent: Jun. 18, 1996

[54] SPINDLE MOTOR

[75] Inventor: Kihachiro Ohta, Naka-gun, Japan

[73] Assignee: Nippon Corporation, Kyoto, Japan

[21] Appl. No.: 293,737

[22] Filed: Aug. 19, 1994

Related U.S. Application Data

[62] Division of Ser. No. 80,741, Mar. 14, 1994, abandoned.

[30] Foreign Application Priority Data

Jun. 23, 1992 [JP] Japan .................................. 4-188766
Oct. 28, 1992 [JP] Japan .................................. 4-313938
Nov. 25, 1992 [JP] Japan .................................. 4-339639

[51] Int. Cl.$^6$ .......................... H02K 7/14; H02K 21/12
[52] U.S. Cl. ......................... 310/67 R; 310/156
[58] Field of Search ................... 310/67 R, 156, 310/261, 42; 360/98.07, 99.04, 99.08

[56] References Cited

U.S. PATENT DOCUMENTS

| | | | |
|---|---|---|---|
| 3,772,544 | 11/1973 | Wrobel | 310/67 R |
| 4,529,901 | 7/1985 | Bartell | 310/67 R |
| 4,634,908 | 1/1987 | Sturm | 310/67 R |
| 4,698,542 | 10/1987 | Muller | 310/67 R |
| 4,779,165 | 10/1988 | Elsaesser et al. | 310/156 |
| 4,900,958 | 2/1990 | Kitahara et al. | 310/67 R |
| 5,025,335 | 6/1991 | Stefansky | 360/97.01 |
| 5,148,338 | 9/1992 | Frugé | 360/98.07 |
| 5,173,814 | 12/1992 | Elsasser et al. | 360/98.07 |
| 5,200,866 | 4/1993 | Frugé et al. | 360/98.07 |
| 5,254,895 | 10/1993 | Koizumi | 310/156 |
| 5,352,947 | 10/1994 | MacLeod | 310/67 R |

FOREIGN PATENT DOCUMENTS 50973  3/1988  Japan .................................. 360/99.04

*Primary Examiner*—Clayton E. LaBalle
*Attorney, Agent, or Firm*—McCormick, Paulding & Huber

[57] ABSTRACT

A spindle motor comprises a stationary member, a rotor rotatably mounted by bearing means to the stationary member for holding a recording disk, a rotor magnet mounted to the rotor, and an armature mounted to the stationary member to seat opposite to the rotor magnet. In particular, the rotor includes a shaft, a hub extending outwardly and radially of the shaft, and a flange provided circumferentially of the hub which are integrally formed from a metal plate by plastic deformation process.

10 Claims, 7 Drawing Sheets

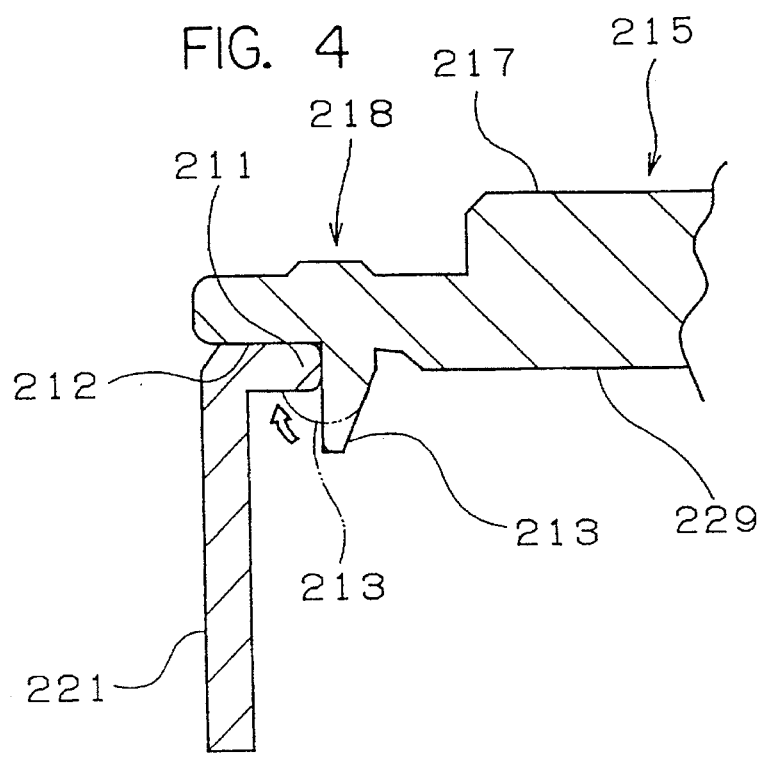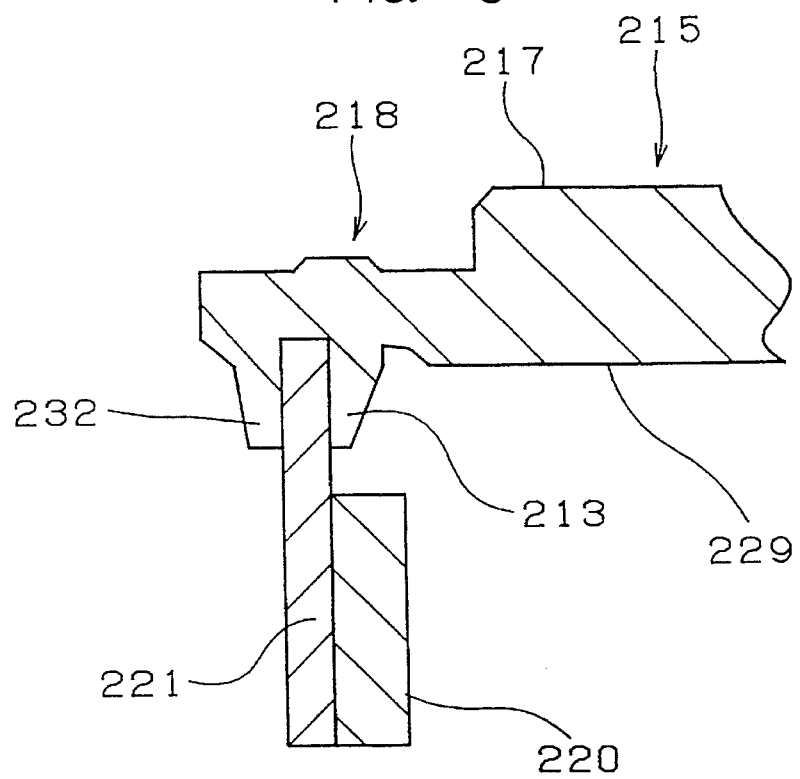

SPINDLE MOTOR

This is a divisional of application Ser. No. 08/080,741 filed Mar. 14, 1994 now abandoned.

FIELD OF THE INVENTION

The present invention relates to a spindle motor for rotating a recording medium such as a magnetic disk or magnetooptical disk.

DESCRIPTION OF THE PRIOR ART

Spindle motors have widely been used for rotating magnetic disks. For example, a typical spindle motor is disclosed in U.S. Pat. No. 5,025,335 which comprises a bracket mountable to the frame of a disk drive apparatus, a rotor to which a magnetic disk(s) is mounted, a pair of bearings provided between the bracket and the rotor, an armature mounted to the bracket, and a rotor magnet provided opposite to the armature. The rotation of the magnetic disk should be at high accuracy thus requiring the dimensional precision of the rotor and the coaxial precision of its components. The rotor has a shaft portion supportedly coupled to the bearings for rotation, a rotor portion loaded with the rotor magnet, and a hub portion arranged for holding the magnetic disk. The portions are constructed integral with each other. The rotor is formed by machining an aluminum or its alloy material into a given shape.

The rotor of the foregoing spindle motor fabricated by machining a material block is thus costly and its fabrication process produces a waste of the material and takes a considerable length of time. As the spindle motors have been downsized for meeting the industrial demands, the rotors are decreased in size and their fabrication by machining becomes harder and costs higher.

Another conventional spindle motor is disclosed in U.S. Pat. No. 4,900,958 in which the axis is provided in the form of a shaft fixed to a bracket (or the frame of a magnetic disk drive apparatus) and the rotor is mounted by bearings to the shaft (fixed axis) for rotation. The shaft is formed of e.g. steel and fixedly joined by bonding or press fitting to the bracket (or the frame). For ensuring the joint strength, the bracket (or the frame) has to provide a room for bonding or press fitting.

The provision of such a room, small or not, will be unfavorable for downsizing of the motor or magnetic disk drive apparatus. If the bracket (or the frame) is minimized too drastically, the shaft will decline in the structural rigidity ensuring no operational accuracy. When the shaft and the bracket (or the frame) are formed integrally by machining from a material, it will increase in the production cost.

SUMMARY OF THE INVENTION

It is a first object of the present invention to provide a spindle motor of which rotor loaded with a recording disk is fabricated at low cost and with much ease.

It is a second object of the present invention to provide a spindle motor of which components are reduced in the size without decreasing the structural rigidity and degrading the motor characteristics for the purpose of downsizing a recording disk drive apparatus. The other objects and features of the present invention will be apparent from reading of the following description.

BRIEF DESCRIPTION OF THE DRAWINGS

FIG. 4 is a cross sectional view of a part of the spindle motor of the third embodiment illustrated in FIG. 3;

FIG. 5 is a cross sectional view of modifications of the spindle motor of the third embodiment;

DETAILED DESCRIPTION OF THE PREFERRED EMBODIMENTS

Spindle motors according to the present invention will be described in conjunction with the accompanying drawings.

First Embodiment

Figure 1:
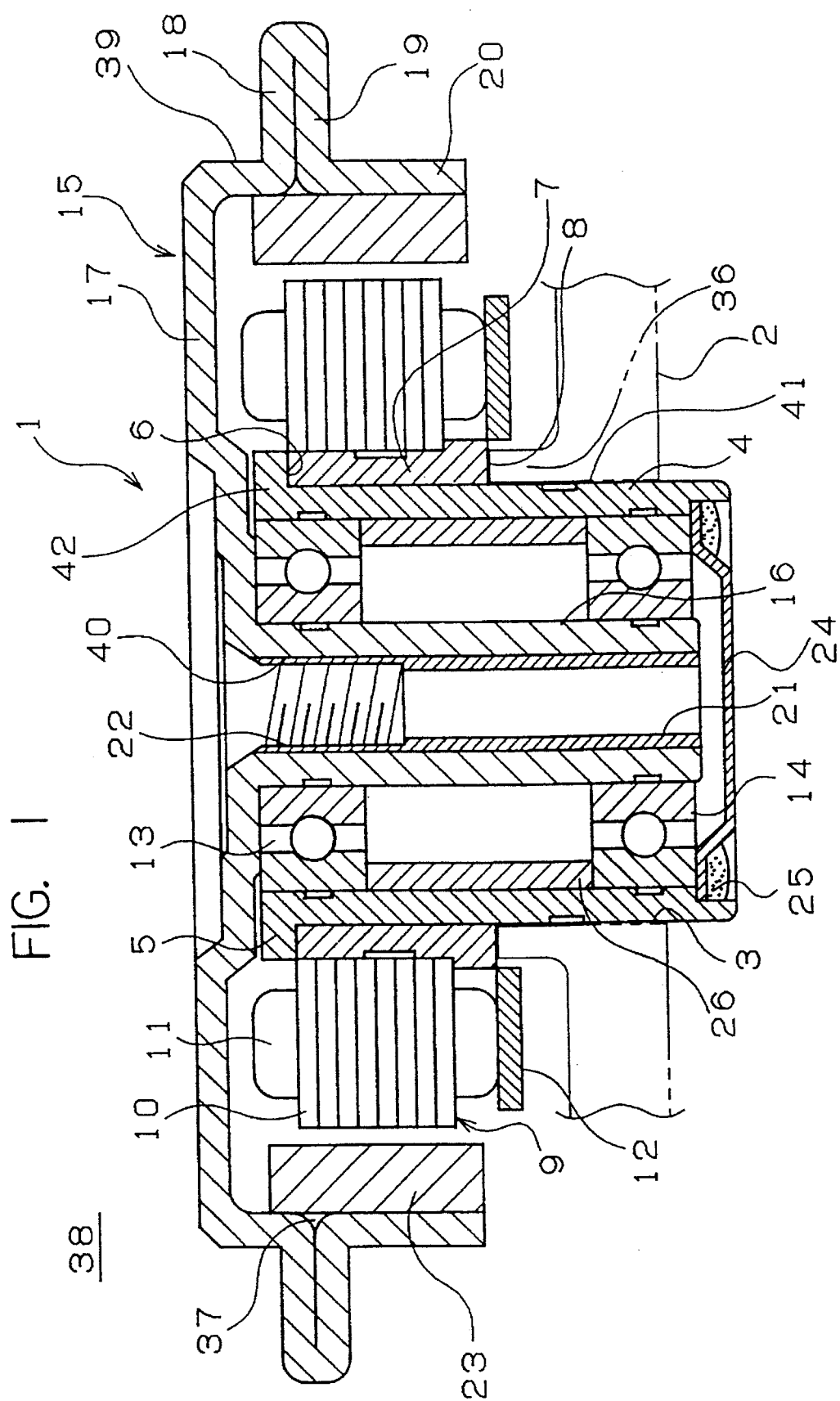
FIG. 1 is a cross sectional view of the entire construction of a spindle motor showing a first embodiment of the present invention.

The first embodiment of the present invention will be described referring to FIG. 1. FIG. 1 is a cross sectional view showing the entire structure of the spindle motor of the first embodiment. As shown, the spindle motor denoted by 1 is mounted on a base 2 which is a member of the housing of a magnetic disk drive apparatus. A rotor 15 on which a magnetic disk (not shown) is placed is provided for rotating motions. The rotor 15 is fabricated by pressing down a steel plate into a shape. The rotor 15 includes a shaft 16 provided at the center thereof, a hub 17 extending radially and outwardly from one end (the upper end in FIG. 1) of the shaft 16, a flange 18 arranged outwardly of and at a level below the hub 17, a folded part 19 arranged directly on the lower surface of the flange 18, and a rotor rim 20 extending axially and downwardly from the folded part 19. Those members 16 to 20 are formed from a single material and coaxially of the shaft 16. The unshown magnetic disk is applied from the top of the rotor 15, aligned by the outside wall 39 of the hub 17, and placed on the flange 18. As the magnetic disk being urged downwardly by a clamp (not shown), it remains tightened to the rotor 15. The spindle motor 1 of this embodiment permits its rotor 15 to hold one recording medium or magnetic disk. The shaft 16 of the rotor 15 has a through bore 40 into which a cylindrical sleeve 21 having a length substantially identical to that of the shaft 16 is fixedly inserted. The sleeve 21 is formed of stainless steel and has a female thread 22 arranged in one end (hub end) thereof. The clamp is threaded into the female thread 22 of the sleeve 21 thus fastening to the rotor 15.

The rotor 15 is supported by a pair of bearings 13 and 14 mounted to the shaft 16. The inner races of the bearings 13 and 14 are bonded to the outer wall of the shaft 16 while the outer races are bonded to the inner wall of a cylindrical support 4. A tube spacer 26 is mounted directly on the inner wall of the cylindrical support 4 between the two bearings 13 and 14 so that the two bearings 13 and 14 are axially aligned and set under proper tensions.

The support 4 is formed by pressing a steel material into a tubular shape and fixedly fitted into a retaining opening 3 of the base 2. The support 4 has an outwardly extending annular rib 42 arranged at the upper end (the rotor 15 side) thereof. The base 2 has an annular raised portion 36 arranged upwardly about its retaining opening 3. The top surface 8 of the raised portion 36 serves as a reference level for axial positioning during mounting of the spindle motor 1 to the base 2. The top surface 8 is designated to be opposite to the lower surface 6 of the annular rib 42 of the support 4 which serves as a reference level of the spindle motor 1. A spacer 7 made of an aluminum material and having given dimensions is fitted and bonded to the outer wall 41 of the support 4 so as to stay between the rib 42 and the raised portion 36 of the base 2. Accordingly, the support 4 is positioned relative to the base 2 in the axial direction. This allows the magnetic disk on the rotor 15 to rotate at a constant height from the base 2. Also, the support 4 is inserted into the opening 3 of the base 2 thus reducing the axial length proportion of the spindle motor 1 to the base 2. As the result, the magnetic disk drive apparatus will be decreased in the thickness. The rotor 15 has the flange 18 and the folded part 19 joined directly to each other so that its rigidity is increased. The rotor 15 can thus hold the magnetic disk securely without deformation or distortion of the flange 18 when the clamp presses against the magnetic disk.

Provided on the outer wall of the spacer 7 is a stator 9 which comprises a stator core 10 having a number of radially extending magnetic teeth and an armature coil 11 wound on the stator core 10. The armature coil 11 is electrically connected by lead lines to a flexible printed circuit board 12 fixedly mounted beneath the armature coil 11. The flexible printed circuit board 12 extends to the outside of the magnetic disk drive apparatus.

A rotor magnet 23 is mounted in an annular arrangement on the inner wall of the rotor 15 so that it comes opposite to the stator 9 with a minimal distance. More specifically, the rotor magnet 23 is bonded to the inner surface of the rotor rim 20 of the rotor 15 while an annular gap 37 between the flange 18 and the folded part 19 acts as an adhesive groove.

A cap 24 of stainless steel is fastened by an adhesive 25 to the lower end of the support 4. As the support 4 is closed with the cap 24, a magnetic disk chamber 38 is isolated from the outside of the base 2 (the lower in FIG. 1). Hence, lubricants in the bearings 13 and 14 and oil polluted air will be prevented from entering the magnetic disk chamber 38.

Accordingly, the spindle motor of the first embodiment has the following advantages. Firstly, it is characterized that the rotor 15 is fabricated by plastically deforming a steel material, by pressing in the embodiment, into the shape including the shaft 16, the hub 17, the flange 18, the folded part 19, and the rotor rim 20 which are thus arranged in a single piece and coaxially of the spindle motor. The operation of pressing action is substantially easy, less costly, and hardly time consumptive. Hence, the production of the rotor 15 will be reduced in the cost and may create less waste of the material. The shaft 16 is simultaneously formed together with the hub 17 and the rotor rim 20 and will thus require non of such conventional fastening and bonding techniques for assembling. Also, the alignment (or arrangement along the center line) of the rotor 15 and the shaft 16 can be conducted with much ease.

Secondly, the spindle motor of the first embodiment is characterized by the cylindrical sleeve 21 which is fitted into the center bore 40 of the shaft 16. As the rotor 15 is formed of a steel plate having a thickness of as small as 0.6 mm, its shaft 16 has to be reinforced for providing an acceptable rigidity. This is realized by the use of the sleeve 21. Also, the rotor 15 of which surfaces are coated with a plating for anticorrosion has to be plated again after forming thread holes in the shaft 16 to fasten the clamp. The sleeve 21 of the first embodiment has the female thread 22 formed therein in advance and can thus accept the clamp without difficulty. Thereby, the plating needs not to be repeated and the plated surface of the rotor 15 will be prevented from unnecessary injury.

The rotor 15 and the sleeve 21 are not limited to the materials and shapes described above and may be fabricated in any appropriate sizes. It would also be understood that although the spindle motor of the first embodiment is loaded with one magnetic disk, it is capable of carrying two or more magnetic disks.

Second Embodiment

Figure 2:
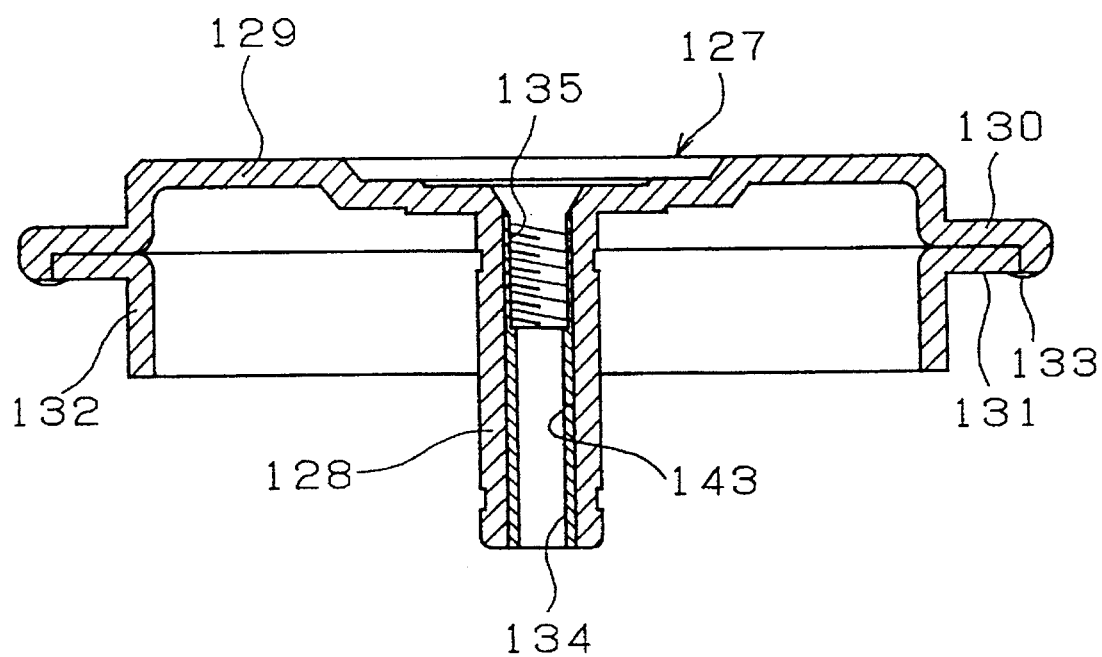
FIG. 2 is a cross sectional view of a part of a spindle motor showing a second embodiment of the present invention.

The second embodiment of the present invention will now be described referring to FIG. 2. FIG. 2 is a cross sectional view showing a rotor 127 of a spindle motor which is substantially similar in the construction to the spindle motor of the first embodiment and of which identical components are not illustrated.

As shown in FIG. 2, the rotor 127 of the second embodiment is consisted of two, first and second, members formed by pressing of steel materials. The first member includes a shaft 128 provided at center, a hub 129 extending radially and outwardly from one end (the upper end in FIG. 2) of the shaft 128, and a flange 130 formed outwardly of and at a level below the hub 129 (for holding a magnetic disk). Those parts 128 to 130 are arranged in a unit. The second member formed by pressing a steel plate into a shape includes a folded part 131 and a rotor rim 132 extending downwardly and axially from the folded part 131 (to hold a rotor magnet). The folded part 131 is shaped to correspond to the flange 130 and has a diameter slightly smaller than that of the flange 130. The first and second members are coupled to each other by locking the flange 130 to the folded part 131 and applying an adhesive 133 to the joint between the flange 130 and the folded part 131. The shaft 128 like that of the first embodiment has at center a through bore 143 where a cylindrical sleeve 134 substantially identical in the length to the bore 143 is installed. The sleeve 134 has a female thread 135 arranged in one end (the hub 129 side) thereof.

Accordingly, the second embodiment which ensures the same advantages as of the first embodiment is applicable to a particular case where the flange 130 and the folded part 131 of the rotor 127 need to be fabricated separately. For example, while the first member is utilized as a common member, the second member is arranged replaceable with another second member of a different size. More specifically, it is designed for production of a series of spindle motors of different outputs to apply the rotor magnets of different sizes (to corresponding dimensions of the stator core) so as to create a variety of combinations. Thus, most of the components are applied for common use and the cost of the production will be reduced considerably.

Third Embodiment

Figure 3:
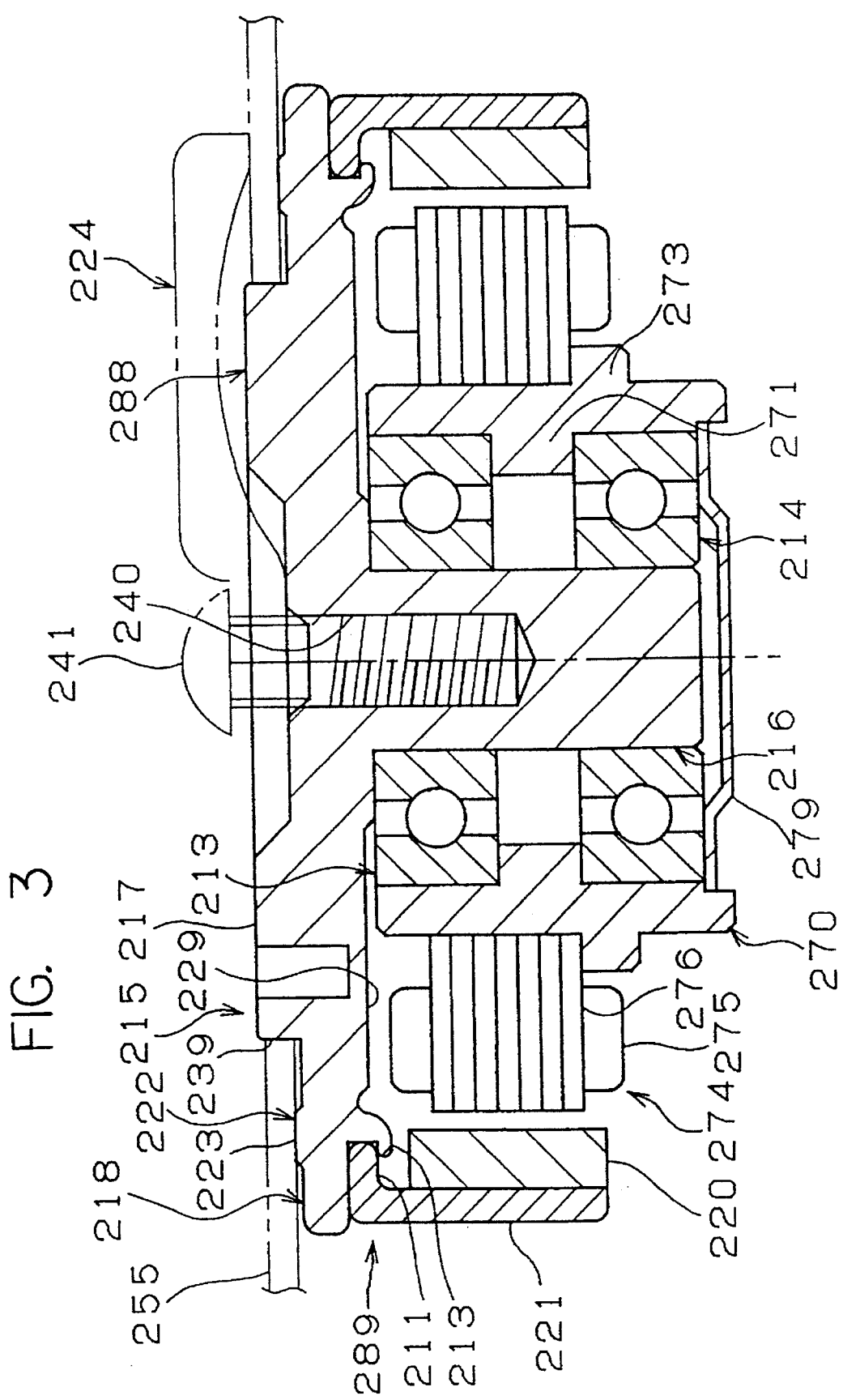
FIG. 3 is a cross sectional view of the entire construction of a spindle motor showing a third embodiment of the present invention.

The third embodiment of the present invention will be explained referring to FIGS. 3 and 4. FIG. 3 is a cross sectional view of a spindle motor of the third embodiment carrying one magnetic disk, similar to the first or second embodiment. As shown, a rotor 215 is loaded with a magnetic disk 255 and comprises a first unit 288 fabricated by machining an aluminum material into a shape and a second unit 289 fabricated by pressing a steel material into a shape. The first unit 288 includes a shaft 216 arranged at the center thereof and a hub 217 extending radially and outwardly from one end (the upper end in FIG. 3) of the shaft 216. The second unit 289 incorporates a rotor yoke 221 to which a rotor magnet 220 is mounted. The rotor yoke 221 is formed of a magnetic material and has a substantially cylindrical shape. The rotor yoke 221 has at the upper end an inwardly turned square bent 211 which is coupled to the first unit 288. The magnetic disk 255 is fitted onto the hub 217 and seated on a flange 218 of the first unit 288 which is arranged outwardly of and at a level below the hub 217. More specifically, the magnetic disk 255 is aligned by the outer wall 239 of the hub 217 and placed directly on the contact surface 223 of an annular projection 222 formed on the top of the flange 218. The magnetic disk 255 is pressed down by a clamp 224 against the rotor 215 for fastening. The clamp 224 is tightened by screwing a bolt 241 into the female thread 240 of the shaft 216 so that the magnetic disk 255 is secured to the rotor 215. In the third embodiment, the magnetic disk 255 is seated directly on the contact surface 223 of the annular projection 222 of the flange 218 and thus, the fabrication of the flange 218 will be facilitated.

The rotor 215 also has an annular rib 213 thereof arranged beneath the flange 218 to extend axially and downwardly. The rib 213 is formed so as to hold the bent 211 of the rotor yoke 221 with the lower surface of the flange 218, allowing the rotor yoke 221 to be locked to the hub 217. The procedure of locking the bent 211 of the rotor yoke 221 by the rib 213 to the hub 217 will be described in detail referring to FIG. 4. FIG. 4 is a cross sectional view showing the rotor yoke 221 and the hub 217 before locking to each other. As shown, the annular rib 213 is straight before locking as denoted by the real line. After the end of the bent 211 of the rotor yoke 221 is abutted to the rib 213, the lowermost of the rib 213 is folded down in the direction denoted by the arrow to press the bent 211 against the lower surface 212 of the flange 218. As the result, the rotor yoke 221 is locked to the hub 217 of the rotor 215 without difficulty.

The rotor 215 is rotatably supported by a pair of bearings 213 and 214 mounted to the shaft 216. The inner races of the two bearings 213 and 214 are fitted onto the shaft 216 while the outer races are mounted to the inner wall of a support 270 of an approximately cylindrical shape. The support 270 has an annular projection 271 arranged on the inner wall thereof between the two bearings 213 and 214. More particularly, the two bearings 213 and 214 are axially defined in position by the projection 271 and thus, set under proper tensions.

The support 270 has a rib 273 arranged on the outer wall thereof for holding a stator 274. The stator 274 includes a stator core 276 which comes opposite to the rotor magnet 220 mounted to the inner wall of the rotor yoke 221. Lead lines from an armature coil 275 of the stator 274 extend through a base, not shown, to the outside of a magnetic disk apparatus. The support 270 is also sealed off at the lowermost end with a cap 279.

The spindle motor of the third embodiment is characterized in that the rotor yoke 221 is fixedly coupled to the hub 217 by a plastic deformation technique so that the rotor 215 is fabricated without difficulty. More specifically, the rotor 215 is fabricated using the plastic deformation of metal and also, its hub 217 has a disk shape which is easily formed. Thus, the processability and the assembly action will be improved contributing to the low cost of the spindle motor.

Although the rotor yoke 221 is coupled to the hub 217 by the annular rib 213 which extends throughout the lower surface of the flange 218, they may be joined to each other by folding a plurality of ribs arranged circumferentially at given intervals.

This embodiment is not limited to the locking manner described above. For example, the bent 211 of the rotor yoke 221 may be adapted for extending outwardly to be locked to the end of the flange 218.

Also, as shown in FIG. 5, an extra annular rib 232 is provided on the lower surface 229 of the hub 217 (coaxially and outwardly of the rib 213) so that the uppermost end of the rotor yoke 221 is fixedly held between the two ribs 213 and 232.

Fourth Embodiment

The fourth embodiment of the present invention will now be described referring to FIG. 6. A spindle motor of the fourth embodiment is substantially identical to that of the third embodiment and while the same components are no more illustrated, a rotor 300 of a different shape only will be explained.

Figure 6:
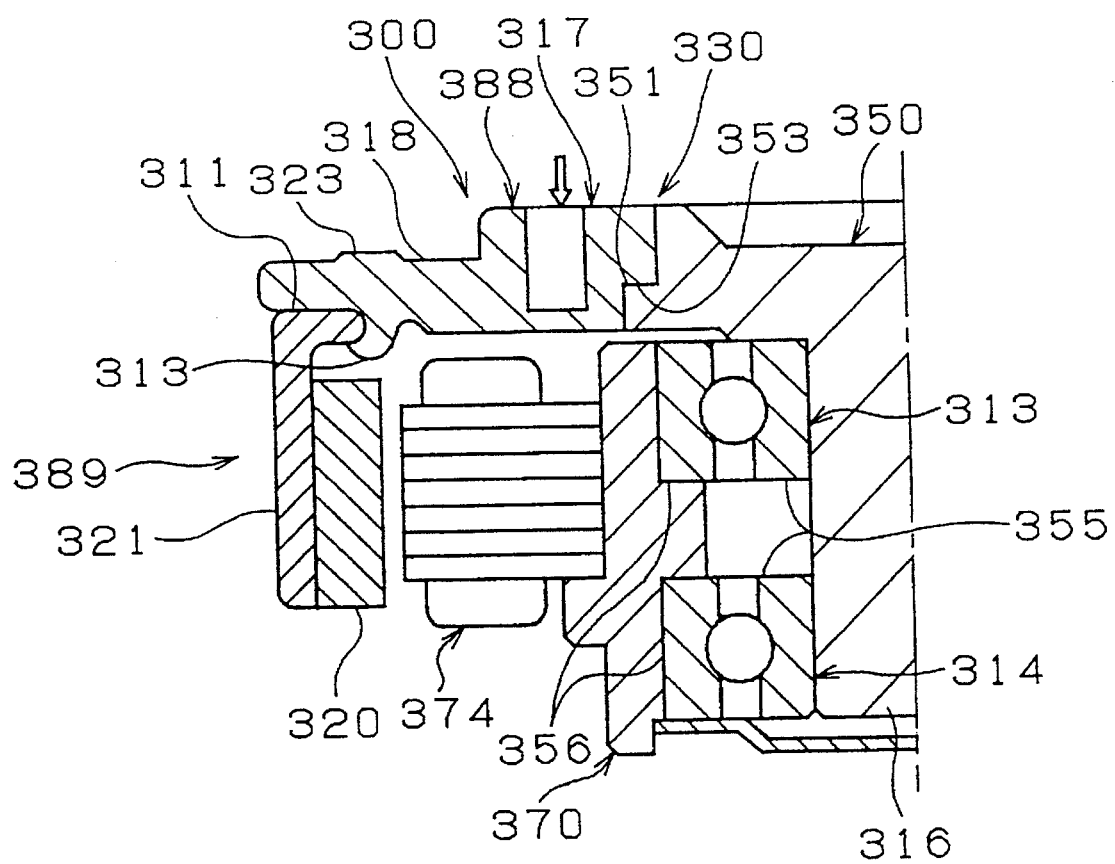
FIG. 6 is a cross sectional view of a part of a spindle motor showing a fourth embodiment of the present invention.

As shown in FIG. 6, a first unit 388 of the rotor 300 has a shaft 316 and a hub 317 arranged separately. The locking of a rotor yoke 321, which remains unchanged in construction, of a second unit 389 to the hub 317 is identical to that of the third embodiment.

The shaft 316 and the hub 317 are coupled to each other at a joint 330. The shaft 316 includes a radially enlarged head portion 350 thereof which has at outer surface a projection 351 for preventing slip-off. The hub 317 has a recess 353 provided in the inner wall thereof for engagement with the projection 351 of the shaft 316. The coupling between the shaft 316 and the hub 317 at the join 330 is realized by a shrink fit or press-in method. Even if a difference in the thermal expansion between the shaft 316 and the hub 317 causes a loose (or gap) at the joint 330, escape of the hub 317 from the shaft 316 in the direction denoted by the arrow will be prevented. Preferably, the hub 317 is formed of e.g. aluminum and the shaft 316 is formed of e.g. steel (or namely, an SUM24L steel material plated at surfaces). Accordingly, the shaft 316 which is a support member of the rotor 300 is increased in the strength minimizing vibration of the rotor 300 during its rotating movement. It is also a good idea to have the shaft 316 formed of a stainless steel (e.g. SUS 303) which is easily machining processed with precision. Accordingly, the stainless steel shaft 316 like the steel shaft is increased in the strength, minimized in the thermal expansion, and dimensioned at high accuracy. In addition, a support 370 shown in FIG. 6 is fabricated from the same material as of the shaft 316. This will prevent axial dislocation of the inner races 355 and outer races 356 of two bearings 313 and 314 caused by a difference in thermal expansion between the shaft 316 and the support 370, eliminating removal of the bearings 313 and 314 by intrinsic stress.

Fifth Embodiment

Figure 7:
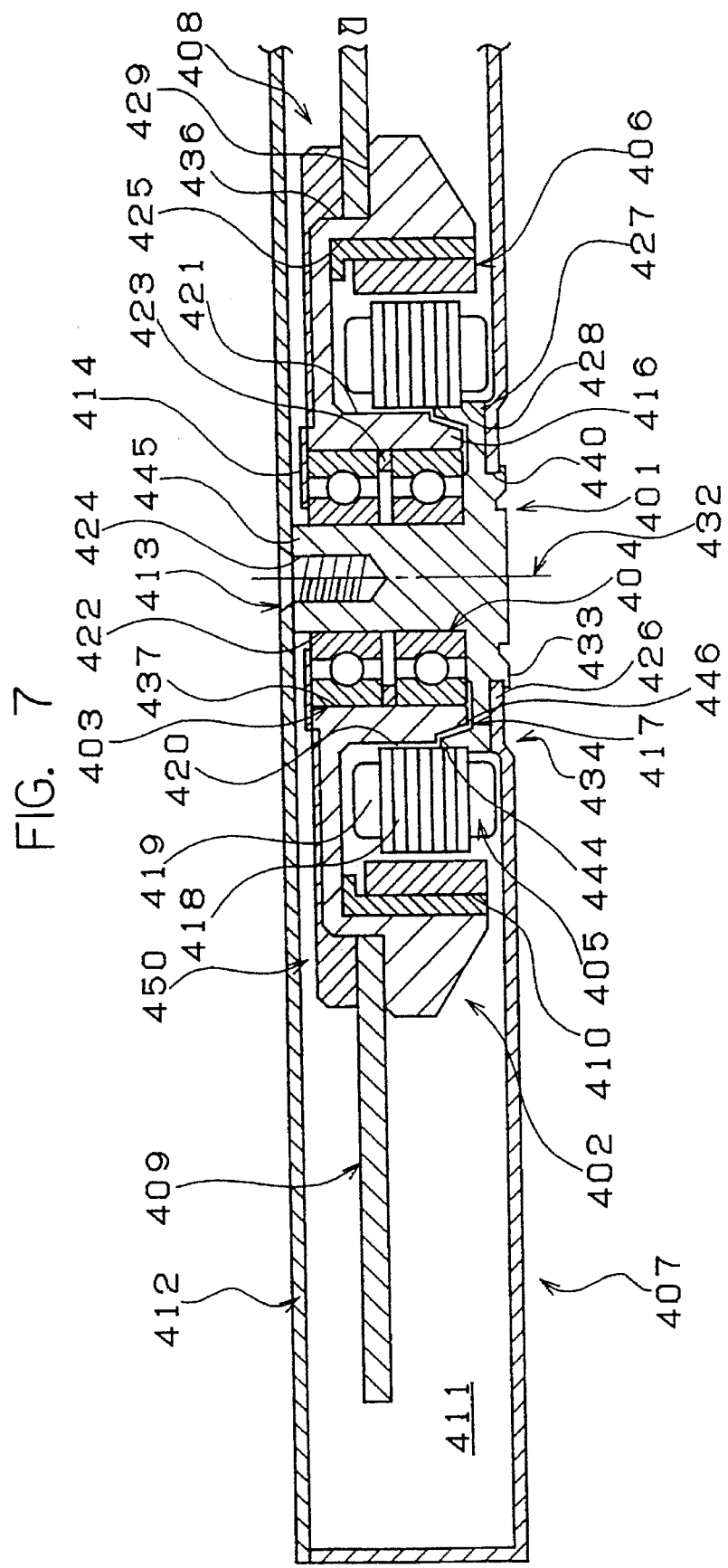
FIG. 7 is a cross sectional view of the entire construction of a spindle motor showing a fifth embodiment of the present invention.
Figure 8:
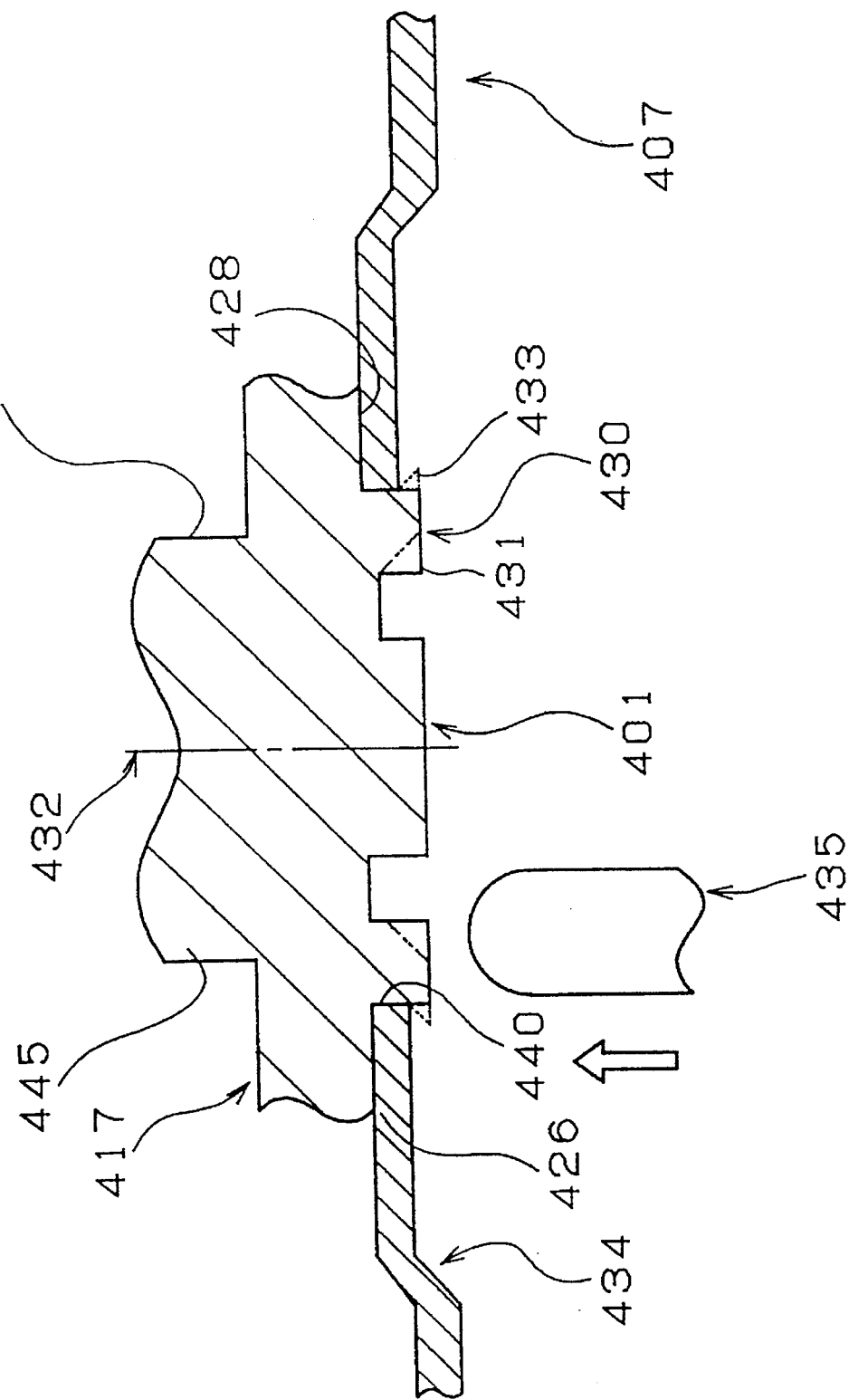
FIG. 8 is a cross sectional view of a part of the spindle motor of the fifth embodiment illustrated in FIG. 7.

The fifth embodiment of the present invention will be described referring to FIGS. 7 and 8. FIG. 7 is a cross sectional view showing a part of a magnetic disk drive apparatus equipped with a spindle motor of the fifth embodiment. As apparent, other components, a magnetic head and its actuator, of the magnetic disk drive apparatus are not illustrated. In FIG. 7, the spindle motor denoted by 450 is accommodated in a closed space or disk chamber 411 defined by an upper base 412 and a lower base 407. The lower base 407 is adapted for common use as a stationary frame (as a stationary member) of the spindle motor 450. A stationary shaft 401 is vertically mounted on the stationary frame 407. The stationary shaft 401 has at top a bore 424 into which a retaining screw 413 is threaded to fasten the upper base 412. Accordingly, the spindle motor 450 is fixedly secured at bottom to the stationary frame 407 and at top to the upper base 412. The stationary shaft 401 is consisted of a cylindrical journal 445 and an annular projection 417 arranged integral with and downwardly and coaxially of the journal 445. The stationary frame 407 and the projection 417 will be explained later in more details.

A rotor 402 on which a magnetic disk 409 is placed is formed of an aluminum material and includes a flange 415 for holding the magnetic disk 409 and a cylinder 416 supporting the flange 415. As shown in FIG. 7, the magnetic disk 409 is mounted on an upper surface 429 of the flange 415 and held tightly by a clamp 408 so that it is assembled integral with the rotor 402. Two bearings 403 and 404 are bonded at outer races to the inner wall 437 of the cylinder 416 of the rotor 402. The outer races of the two bearings 403 and 404 are spaced from each other by an annular spacer 423. The inner races of the bearings 403 and 404 are fixedly bonded to the outer wall 422 of the stationary shaft 401. The inner and outer races of the two bearings 403 and 404 are set under tensions between the cylinder 416 of the rotor 402 and the outer wall 422 of the stationary shaft 401. Eventually, the rotor 402 is rotatably supported at precision by the stationary shaft 401. A rotor magnet 406 of an annular shape is mounted by a rotor yoke 410 of a magnetic material to the inner wall 425 of the flange 415 of the rotor 402. Also, a stator 405 is radially mounted to the stationary shaft 401 so that it comes opposite to the rotor magnet 406. The stator 405 comprises a stator core 418 and an armature coil 419 wound on the stator core 418. The inner wall 420 of the stator core 418 is fitted at lower end onto the outer wall 444 of the projection 417 of the stationary shaft 401. A seal 414 is mounted on the upper end of the upper bearing 403. The seal 414 is also bonded to the uppermost end of the cylinder 416 of the rotor 402 so that it can rotate with the outer race of the bearing 403. The seal 414 is spaced a bit from the inner race of the bearing 403. Accordingly, polluted air contaminated by lubricant of the bearing 403 is prevented by the seal 414 from entering through the upper end of the bearing 403 into a disk chamber 411. The passage from the lower bearing 404 to the disk chamber 411 is shaped into a labyrinth where spaces between the projection 417 of the stationary shaft 401 and the lowermost end 446 of the cylinder 416 of the rotor 402 and between the inner wall 420 of the stator core 418 and the outer wall 421 of the cylinder 416 are minimized. As the result, polluted air contaminated by lubricant of the lower bearing 404 will effectively be prevented from entering the disk chamber 411.

The locking of the stationary shaft 401 to the stationary frame 407 will now be explained referring to FIG. 8. FIG. 8 is an enlarged cross sectional view showing the coupling between the projection 417 of the stationary shaft 401 and the stationary frame or lower base 407 by the plastic deformation process. The projection 417 has an annular rib 430 arranged on the lower surface thereof about the axis of rotation 432. The annular rib 430 of the stationary shaft 401 is tightly inserted into a center opening 440 of the stationary frame 407. More particularly, the annular rib 430 is joined to the stationary frame 407 by making a grip 433, allowing the stationary shaft 401 to be locked to the stationary frame 407. In the process, the annular rib 430 is inserted into the opening 440 of the stationary frame 407 and its lower surface 431 is malleted in a radial direction by e.g. a calking tool 435 to form the grip 433 throughout the annular rib 430. As the result, an around-the-opening contact portion 426 of the stationary frame 407 is tightly held between the grip 433 and the lower surface 428 of the projection 417. The stationary frame 407 is formed of a 0.3-mm thick steel material. The shape of the annular rib (or its grip 433) is about 6 mm in diameter. The contact portion 426 of the stationary frame 407 is raised by a bent 434 for clearing the grip 433 so that the stationary frame 407 is leveled at the bottom.

The spindle motor of the fifth embodiment is characterized in that the stationary shaft 401 is locked to the stationary frame 407 by means of a plastic deformation process. This allows the spindle motor 450 to be reduced in the thickness (or height in the drawings) as compared with a conventional spindle motor using an aluminum bracket or frame and thus to contribute to the downsizing of a magnetic disk drive apparatus. The space of electromagnetic actions for producing a rotation will be ensured without giving any tradeoff in the spindle motor of the fifth embodiment. Also, the projection 417 remains as thin as 0.5 mm and will rarely affect the overall thickness of the spindle motor. The stationary frame 407 is a part of the lower base of the disk drive apparatus decreasing the overall thickness and the number of components. When the ratio of the thickness of the stationary frame 407 to the size of the grip 433 is 20:1, the strength of locking becomes optimum although it depends more or less on the material and shape. The ratio of more than 20:1 is thus preferred. The stationary shaft 401 fixedly mounted to the stationary frame 407 will thus be guaranteed in the structural rigidity.

Although the stationary shaft 401 of the spindle motor is locked to the stationary frame 407 of the disk drive apparatus in the fifth embodiment of the present invention, it may be secured in any appropriate manner. For example, the stationary shaft 401 is fixedly mounted to an L-shaped bracket which is locked to the stationary frame (or the lower base) 407.

It should be understood that the present invention is not limited to the spindle motors of the forgoing embodiments and changes and modifications will be possible without departing from the scope and spirits of the present invention.

What is claimed is:

1. A spindle motor comprising a stationary member, a rotor rotatably mounted by bearing means to the stationary member for holding a recording disk, said rotor including a folded part turned radially from the outward end of the flange and a rim extending downwardly from the folded part, a rotor magnet mounted to the rotor, and an armature mounted to the stationary member to seat opposite to the rotor magnet, characterized in that said rotor includes a shaft, a hub extending outwardly and radially of the shaft, and a flange provided circumferentially of the hub which are integrally formed from a metal plate by plastic deformation process.

2. A spindle motor according to claim 1, wherein the shaft, the hub, the flange, the folded part, and the rim of said rotor are integrally formed from a metal plate by plastic deformation process.

3. A spindle motor according to claim 1, wherein the shaft, the hub, and the flange are integrally formed from a metal plate by plastic deformation process and designated as a first unit of said rotor while the folded part and the rim are integrally formed from a metal plate by plastic deformation process and designated as a second unit of said rotor.

4. A spindle motor according to claim 3, wherein the first and second units of said rotor are joined to each other by plastic deformation process.

5. A spindle motor according to claim 1, wherein an annular recess is provided between the inner walls of the flange and the folded part of said rotor to serve as an adhesive groove for bonding the rotor magnet.

6. A spindle motor according to claim 1, wherein the shaft of said rotor is formed of a hollow tubular shape and contains a reinforcement sleeve fitted to the inner wall thereof.

7. A spindle motor according to claim 6, wherein the reinforcement sleeve has a female thread arranged in one end of the inner wall thereof.

8. A spindle motor according to claim 1, wherein said stationary member is formed by plastic deformation of a metal plate.

9. A spindle motor according to claim 8, wherein the stationary member of said rotor is formed of a hollow tubular shape and an armature is mounted by a spacer to the outer surface of the stationary member.

10. A spindle motor according to claim 1, wherein the shaft, the hub, and the flange of said rotor are formed separately and assembled to one unit by plastic deformation process.

* * * * *